(12) United States Patent
Bahnsen et al.

(10) Patent No.: US 9,524,219 B2
(45) Date of Patent: Dec. 20, 2016

(54) ATOMIC TRANSACTIONS TO NON-VOLATILE MEMORY

(71) Applicants: Robert Bahnsen, Boulder, CO (US); Sridharan Sakthivelu, DuPont, WA (US); Vikram A. Saletore, Olympia, WA (US); Krishnaswamy Viswanathan, Portland, OR (US); Matthew E. Tolentino, Olympia, WA (US); Kanivenahalli Govindaraju, Federal Way, WA (US); Vincent J. Zimmer, Federal Way, WA (US)

(72) Inventors: Robert Bahnsen, Boulder, CO (US); Sridharan Sakthivelu, DuPont, WA (US); Vikram A. Saletore, Olympia, WA (US); Krishnaswamy Viswanathan, Portland, OR (US); Matthew E. Tolentino, Olympia, WA (US); Kanivenahalli Govindaraju, Federal Way, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 14/040,380

(22) Filed: Sep. 27, 2013

(65) Prior Publication Data
US 2015/0095600 A1    Apr. 2, 2015

(51) Int. Cl.
*G06F 12/14* (2006.01)
*G06F 11/14* (2006.01)
*G06F 9/46* (2006.01)

(52) U.S. Cl.
CPC ........... *G06F 11/1474* (2013.01); *G06F 9/466* (2013.01); *G06F 12/1441* (2013.01)

(58) Field of Classification Search
CPC ...................................................... G06F 9/467
See application file for complete search history.

(56) References Cited

U.S. PATENT DOCUMENTS

| | | | |
|---|---|---|---|
| 5,657,474 A * | 8/1997 | Paul Dubois Taine | G06F 9/526 707/999.201 |
| 2010/0049718 A1* | 2/2010 | Aronovich | G06F 17/30115 707/607 |
| 2010/0153660 A1* | 6/2010 | Lasser | G06F 12/0246 711/154 |
| 2011/0246725 A1* | 10/2011 | Moir et al. | 711/147 |

* cited by examiner

*Primary Examiner* — Christian P Chace
*Assistant Examiner* — Eric Loonan
(74) *Attorney, Agent, or Firm* — Lowenstein Sandler LLP

(57) ABSTRACT

Durable atomic transactions for non-volatile media are described. A processor includes an interface to a non-volatile storage medium and a functional unit to perform instructions associated with an atomic transaction. The instructions are to update data at a set of addresses in the non-volatile storage medium atomically. The functional unit is operable to perform a first instruction to create the atomic transaction that declares a size of the data to be updated atomically. The functional unit is also operable to perform a second instruction to start execution of the atomic transaction. The functional unit is further operable to perform a third instruction to commit the atomic transaction to the set of addresses in the non-volatile storage medium, wherein the updated data is not visible to other functional units of the processing device until the atomic transaction is complete.

25 Claims, 12 Drawing Sheets

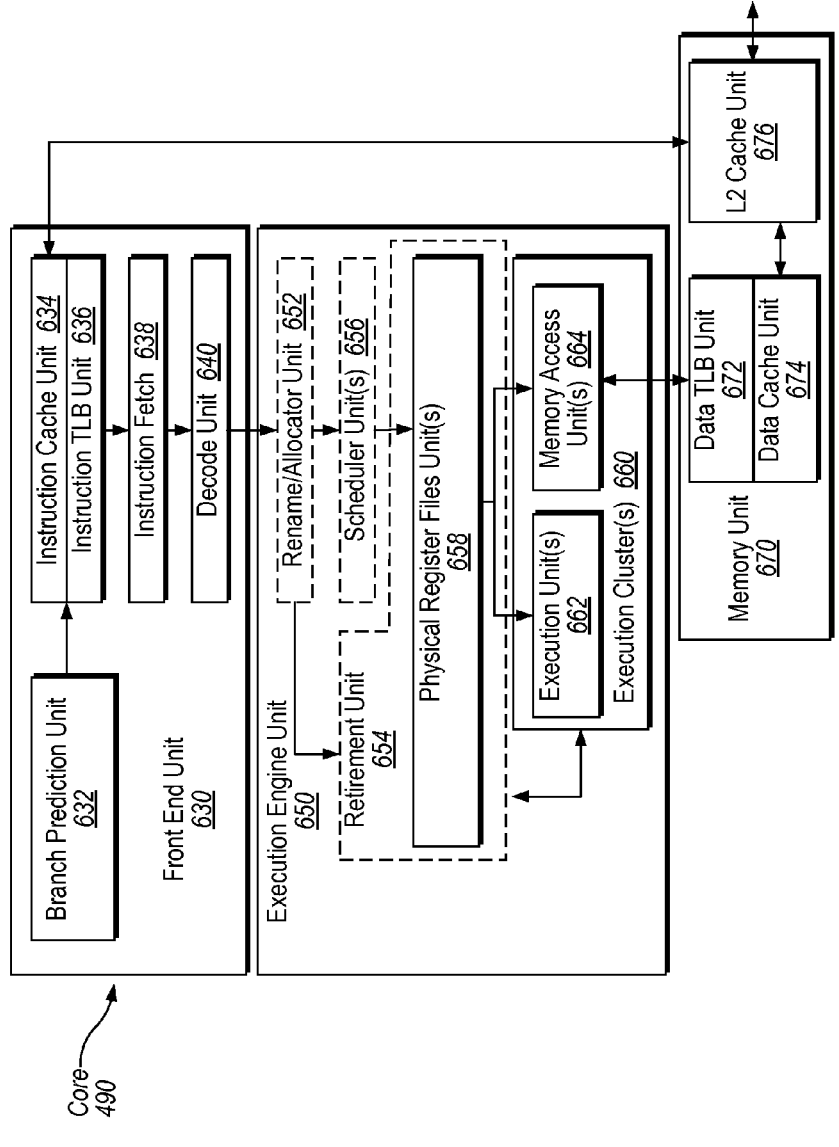
FIGURE 6A
FIGURE 6B

ATOMIC TRANSACTIONS TO NON-VOLATILE MEMORY

Embodiments described herein generally relate to processing devices and, more specifically, relate to atomic transactions to non-volatile media.

BACKGROUND

Memory refers to the physical devices used to store programs (e.g., sequences of instructions) or data (e.g. program state information) on a temporary or permanent basis for use in a computer or other digital electronic devices. The terms "memory" "main memory" or "primary memory" can be associated with addressable semiconductor memory, i.e. integrated circuits consisting of silicon-based transistors, used for example as primary memory in computers.

BRIEF DESCRIPTION OF THE DRAWINGS

FIG. 6A illustrates elements of a processor micro-architecture according to implementations.

FIG. 6B illustrates elements of a processor micro-architecture according to implementations.

DESCRIPTION OF EMBODIMENTS

Figure 1:
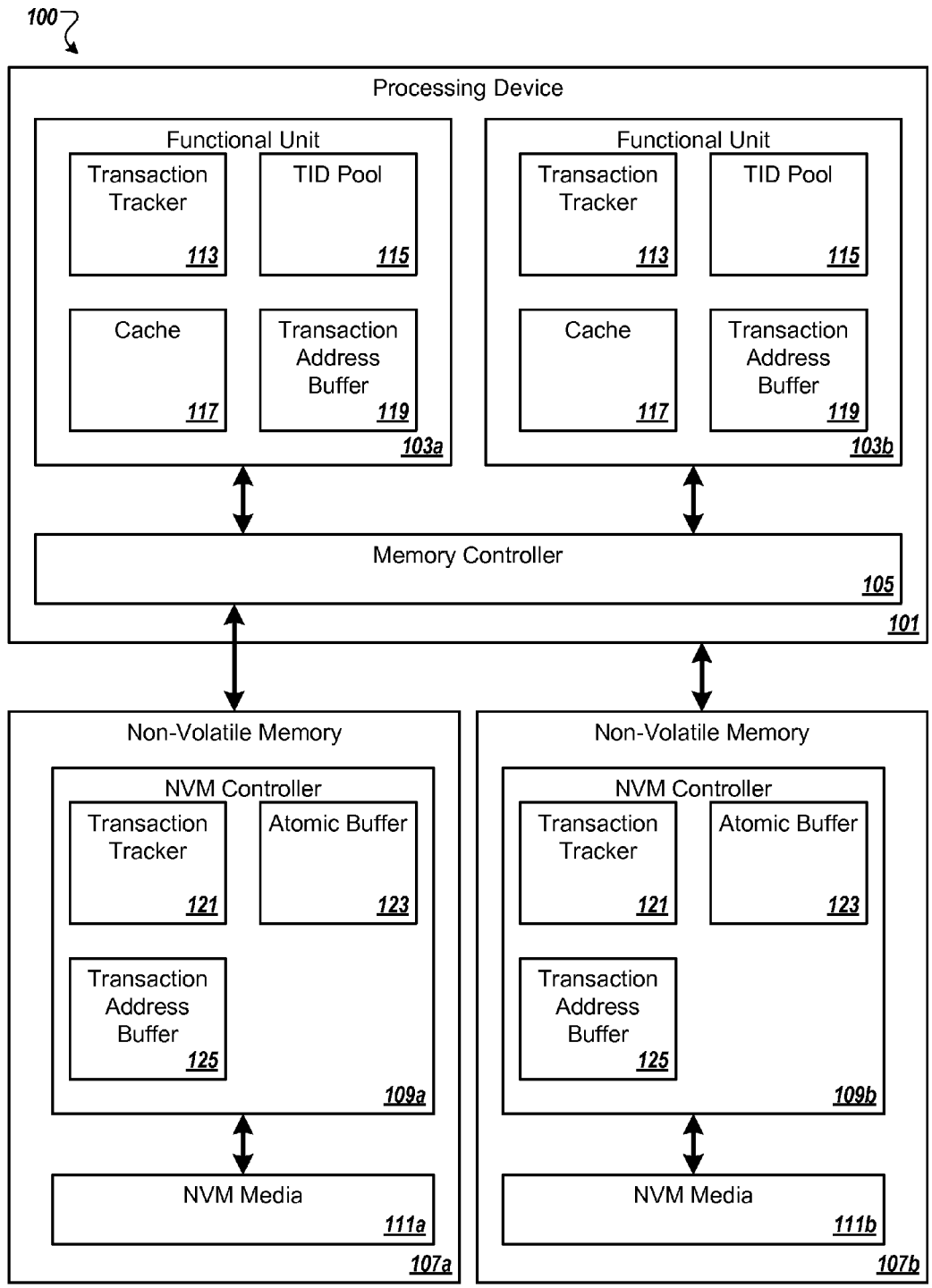
FIG. 1 is a block diagram illustrating a computing system according to implementations.

In the following description, numerous specific details are set forth, such as examples of specific types of processors and system configurations, specific hardware structures, specific architectural and micro architectural details, specific register configurations, specific memory positions, specific instruction types, specific system components, etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic, and other specific operational details of computer system have not been described in detail in order to avoid unnecessarily obscuring the present disclosure.

The present disclosure pertains to durable atomic transactions to non-volatile media. In computing, non-volatile media refers to a device that should retain its contents indefinitely—the data should persist even when the device loses power. Non-volatile media can be used as computer memory. An atomic transaction is a set of transactions where each transaction needs to be completed successfully for the atomic transaction to be successful. Otherwise, the atomic transaction is not complete and can result in data errors. For example, an atomic transaction can be a transfer of funds from one back account to another. The series of transactions can include withdrawing the funds from a sender account and then depositing the funds in a receiver account. If the funds are withdrawn from the sender account but not deposited in the receiver account, the entire atomic transaction is not complete. Since the receiver did not receive the funds, they should be available to the sender for another transaction. Another example can include an atomic transaction to modify a set of addresses of non-volatile media or values associated with the set of addresses.

Contemporary computer architecture does not support atomic transactions for non-volatile memory. Under contemporary techniques, in the event of a failure during execution of a transaction, some of data may have been modified while other data that should have been modified was not modified. To handle this incomplete transaction, contemporary techniques discard all of the data that was written or modified (e.g., by clearing memory) and then start the transaction again using an empty memory. For non-volatile media, the data should persist; other processes may rely on and expect the data to be present in the non-volatile media. Discarding the data can negatively impact processes of a computing system. Accordingly, the data stored by non-volatile media should be preserved to avoid errors in the event of an atomic transaction failure.

Aspects of the present disclosure enable durable atomic transactions to non-volatile memory. A processor of a computer system can include a functional unit that declares the start of a transaction. For example, the functional unit can declare that the functional unit will modify data or a set of addresses associated with non-volatile media. The functional unit then modifies the data associated with the non-volatile media. Then, the functional unit ends the transaction and makes the modified data associated with non-volatile media accessible to other functional units of the computer system. When a second functional unit attempts to access the data associated with non-volatile media before the atomic transaction is complete, the second functional unit receives old data associated with non-volatile media. In this manner, other functional units can use the old data even while the atomic transaction is in progress, which also provides the advantage of not needing to lock data for the duration of an atomic transaction.

Performing the atomic transaction can include writing to a set of addresses of non-volatile media. Before writing to the set of addresses, a processing device can register the atomic transaction to indicate that the set of addresses is to be updated. Because the transaction is an atomic transaction, other processors, functional units, processes, threads, cores, etc. should not be able to modify the set of addresses until the entire atomic transaction is complete. To accomplish this, the processing device can write to the set of addresses in an intermediate memory location, such as to an integrated cache, external cache, a memory buffer (e.g., atomic buffer), etc. that is segregated from other applications or execution units. Once the entire atomic transaction is complete and when data is written to the set of addresses in the intermediate memory location, the processing device can lock the set of addresses and then write the data from the intermediate memory location to the non-volatile media. When writing the data to the non-volatile media is complete, the processing device can unlock the set of addresses after which the addresses become available to other processors, functional units, processes, threads, cores, etc. Multiple atomic transactions can be in progress within an application or across the computer system. One functional unit, for example, may have multiple atomic transactions in progress at any given time.

FIG. 1 is a block diagram illustrating a computing system 100 that implements durable atomic transactions for non-volatile memory 107. The computing system 100 may be connected (e.g., networked) to other machines in a LAN, an intranet, an extranet, or the Internet. The computing system 100 may operate in the capacity of a server or a client device in a client-server network environment, or as a peer machine in a peer-to-peer (or distributed) network environment. The computing system 100 may be a personal computer (PC), a tablet PC, a set-top box (STB), a web appliance, a server, a network router, switch or bridge, micro controller, a digital signal processor (DSP), system on a chip, network computers (NetPC), network hubs, wide area network (WAN) switches, or any machine capable of executing a set of instructions (sequential or otherwise) that specify actions to be taken by that machine. Further, while only a single machine is illustrated for the computing system 100, the term "machine" shall also be taken to include any collection of machines that individually or jointly execute a set (or multiple sets) of instructions to perform any one or more of the methodologies discussed herein. Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs.

The computing system 100 includes a processing device 101 to process data signals. The processing device 101, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. Computing system 100 is representative of processing systems based on the PENTIUM III™, PENTIUM 4™, Celeron™, Xeon™, Itanium, XScale™, StrongARM™, Core™, Core 2™, Atom™, and/or Intel® Architecture Core™ such as an i3, i5, i7 microprocessors available from Intel Corporation of Santa Clara, Calif., although other systems (including PCs having other microprocessors, engineering workstations, set-top boxes and the like) may also be used. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. In one embodiment, processing device 101 executes a version of the WINDOWS™ operating system available from Microsoft Corporation of Redmond, Wash., although other operating systems (OS X, UNIX, Linux, Android, iOS, Symbian, for example), embedded software, and/or graphical user interfaces, may also be used. Thus, embodiments of the present invention are not limited to any specific combination of hardware circuitry and software. One embodiment may be described in the context of a single processor desktop or server system, but alternative embodiments may be included in a multiprocessor system. Computing system 100 may be an example of a 'hub' system architecture.

The processing device 101 is coupled to a processor bus that transmits data signals between the processing device 101 and other components in the computing system 100. The elements of computing system 100 (e.g. memory controller 105, memory 107, and other elements that are not shown, such as a graphics accelerator, I/O controller hub, wireless transceiver, Flash BIOS, Network controller, Audio controller, Serial expansion port, I/O controller, etc.) perform their conventional functions that are well known to those familiar with the art.

The processing device 101 can employ multiple functional hardware units 103a, 103b (also referred to as "functional units") of an integrated circuit die. In one embodiment, the computing system 100 is integrated in an integrated circuit die having multiple functional units 103a, 103b (hereafter referred to as a multi-core system). In another embodiment, the computing system 100 is integrated into multiple dies in a single package. The multi-core system may be a multi-core processor package, but may include other types of functional units than just processor cores.

Functional units may be processor cores (e.g., 103a, 103b), graphics cores (also referred to as graphics units), cache elements, computation elements, and their controllers, network controllers, fabric controllers, or any combination thereof. Functional units may be logical processors, which may be considered the processor cores themselves or threads executing on the processor cores. A thread of execution is the smallest sequence of programmed instructions that can be managed independently. Multiple threads can exist within the same process and share resources such as memory, while different processes usually do not share these resources. Functional units 103a, 103b may or may not share caches, and they may implement message passing or shared memory inter-core communication methods on a communications interconnect. Homogeneous multi-core systems are systems with identical cores. Sometimes identical cores are also referred to as equivalent cores. Heterogeneous multi-core systems have cores that are not identical or disparate functional units. Just as with single-processor systems, cores in multi-core systems may implement architectures such as superscalar, multithreading, vector processing or the like. It should be noted that the embodiments described below are described in the context of an example multi-core system including multiple processor cores and multiple graphics cores for simplicity of description.

The computing system 100 is a multi-core system, which is a single computing component with multiple independent central processing units (CPUs), which are functional units 103a, 103b that read and execute program instructions. The multi-core systems may implement multiprocessing in a single physical package. The computing system 100 can also include multiple graphics cores, which are configured to accelerate the building of images intended for output to a display.

The functional unit 103 can include logic to perform algorithms for processing data, in accordance with implementations described herein. Functional unit 103, including logic to perform integer and floating point operations, also resides in the processing device 101. The functional unit 103 may or may not have a floating point unit. The processing device 101, in one embodiment, includes a microcode (ucode) ROM to store microcode, which when executed, is to perform algorithms for certain macroinstructions or handle complex scenarios. Microcode is potentially updateable to handle logic bugs/fixes for processing device 101. Alternate embodiments of a functional unit 103 may also be used in micro controllers, embedded processors, graphics devices, DSPs, and other types of logic circuits. As the term is used herein, the functional unit 103 can refer to a logical processor, thread, hyperthread, core, etc. The computing system 100 can have multiple functional units to handle multiple, simultaneous atomic transactions.

In one embodiment, the processing device 101 includes a cache 117. Depending on the architecture, the processing device 101 may have a single internal cache or multiple levels of internal caches. Other embodiments include a combination of both internal and external caches depending on the particular implementation and needs. A register file (not shown) is to store different types of data in various registers including integer registers, floating point registers, vector registers, banked registers, shadow registers, checkpoint registers, status registers, and instruction pointer register.

A memory controller 105 is a digital circuit that manages data communications between the processing device 101, and one or more NVM controllers 109, and other components in the computing system 100 and system I/O. The memory controller 105 can provide a high bandwidth memory path to memory 107 for instruction and data storage and for storage of graphics commands, data and textures. The memory controller 105 can be used to direct data signals between the processing device 101, memory 107, and other components in the computing system 100 and to bridge the data signals between processor bus, memory 107, and system I/O, for example. The memory controller 105 may be coupled to memory 107 through a memory interface. The memory controller 105 is coupled to the processing device 101. In implementations, the memory controller 105 is integrated into the processing device 101. In other implementations, the memory controller is external to the processing device 101 and can communicate with the processing device 101 via an interface. The memory controller 105 can be coupled to one or more memory devices 107a, 107b through an interface.

Computing system 100 includes a memory 107. Memory 107 includes any type of persistent or non-volatile media, such as a flash memory device, a solid-state device (SSD), a memristor, phase change memory (e.g., PCS, PCM, PCME, PCRAM, Ovonic Unified Memory, Chalcogenide RAM, C-RAM, etc.), or other storage or memory device. The memory 107 can be byte-addressable. Memory 107 stores instructions and/or data represented by data signals that are to be executed by the processing device 101. The processing device 101 is coupled to the memory 107 via a processor bus (not shown). In some implementations, the memory 107 is a dual-inline memory module (DIMM). In an example, the computing system 100 includes 1 TB of total memory—four DIMMS, each with 256 GB of capacity. The memory 107 can include a NVM controller 109 to interface between the memory controller 105 and with the NVM media 111. The NVM controller 109 manages modifications (e.g., reads, writes, commits) to the NVM media 111.

The computing system 100 may also include an I/O controller hub (ICH). The ICH can provide direct connections to some I/O devices via a local I/O bus. The local I/O bus is a high-speed I/O bus for connecting peripherals to the memory 107, chipset, and processing device 101. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

In operations, the processing device 101 can create a new atomic transaction, such as in response to a communication or request received from an application executing on the computing system 100. The application can indicate a size of data and/or number of addresses to be updated by the atomic transaction. In other implementations, the processing device 101 determines the number of addresses to be updated by the atomic transaction in view of the communication received from the application to initiate an atomic transaction. To handle an atomic transaction to non-volatile media, functional unit 103 can include a transaction tracker 113, a transaction identification (TID) pool 115, cache 117 and a transaction address buffer 119. For computing systems 100 that include a plurality of functional units 103a, 103b, each functional unit 103 can have its own transaction tracker 113, a TID pool 115, cache 117 and a transaction address buffer 119.

When the processing device 101 creates a new atomic transaction, processing device 101 can assign the atomic transaction a transaction identification (TID) using the transaction tracker 113. The TID is a unique identifier for a transaction with computing system 100. A TID can be associated with a functional unit that created it for the duration of the transaction. The TID can also be associated with a set of addresses to be updated during execution of the atomic transaction. The TID assigned to the atomic transaction can come from a TID pool 115, which is a collection of all available TIDs. The TID pool 115 can include any number of transactions. In implementations, a system administrator can use the TID pool 115 to limit the number of transactions that are allowed to execute simultaneously. The transaction tracker 113 can also track, monitor and update the state of an atomic transaction. During the execution of the atomic transaction, the TID and/or addresses associated with the TID can have different states. Example states include "processing," "locked," "invalid," and "visible," each described in further detail in conjunction with FIG. 2. Transactions can be tracked using a table that maps a TID to a state. An example transaction tracking table can be as follows:

| TID | State |
| --- | --- |
| 10 | Valid |
| 11 | Locked |
| 12 | Processing |

Atomic transaction tracking can be performed at the transaction level. The transaction tracker 113 can actively (e.g., by broadcasting) or passively (e.g., by responding to a request) inform the processing device 101 of a current state of a TID or of addresses associated with an atomic transaction. Based on the current state of the TID or addresses, the processing device 101 can perform different operations to the memory 107, irrespective of whether the operations are part of the atomic transaction or not. For example, if an application or functional unit that is not associated with a particular TID requests to read an address that is associated with the TID, then the requesting application or functional unit can receive the old (i.e., not yet updated) address values.

The processing device 101 can register a set of addresses to be updated atomically in a transaction address buffer 119. The transaction address buffer 119 tracks which addresses are part of a particular atomic transaction and communicates this information to the transaction tracker 113. The transaction address buffer 119 can be used to mark an address range with a non-zero TID if that address range is part of a transaction. For example, an address associated with a TID of "0" means that address is not part of a transaction. The transaction address buffer 119 can be coherently maintained across all platform agents that participate in the transaction (e.g., CPU and NVM controller and others). Example entries in the transaction address buffer 119 include:

| TID | Address Range |
|---|---|
| 10 | 0x1234-0x1260 |
| 10 | 0xf000-0xf008 |
| 12 | 0x4870-0x4880 |

In one implementation, once all of the addresses to be updated have been registered, the processing device 101 can begin executing the atomic transaction.

The cache 117 can be used by the processing device 101 to perform data modification and then copy or flush the modified data to the NVM controller 109 or directly to the NVM media 111. To accommodate both a TID during execution as well as other applications or functional units 103 that may need to access data associated with a same address that is being modified by the TID, the cache 117 can store two copies of data—one for the TID and the other being an old value for use by the other application or functional unit 103b. The cache 117 can be configured or expanded to store any type of duplicate data, such as multiple cache lines, multiple cache pages, multiple registers, etc.—each having the same address. To return the correct data to the requesting functional unit, the cache returns the data based on the TID of the requestor. A TID for an atomic transaction receives data associated with the TID and a TID that is not part of the atomic transaction receives the old data.

The NVM controller 109 can include a transaction tracker 121. The transaction tracker 113 of the functional unit 103 and the transaction tracker 121 of the NVM controller 109 can be in data communication and can have the same data. When receiving updated information regarding a transaction, each transaction tracker 113 and 121 can exchange the updated information amongst each other. In one implementation, the transaction tracker 121 is a mirror of the transaction tracker 113. In other implementations, the transaction trackers 113 and 121 are logical representations of a single transaction tracker in a functional unit 103 and NVM controller, respectively. Further implementations include an external transaction tracker that each transaction tracker 113 and 121 can read.

The NVM controller can also have a transaction address buffer 125, which can include the same data and perform the same function as the transaction address buffer 119. The transaction address buffer 125 on the NVM controller 109 can have a different address format, such as a device level address instead of a global or system level address that may be represented in the transaction address buffer 119 of the functional unit 103. When multiple memory devices 107a and 107b are part of computing system 100, each memory device 107 may not have address data for other memory devices. For example, a system can have four memory devices totaling 1 TB, where each memory device has 256 GB. Each NVM controller may only have its respective addresses (e.g., 0-255 addresses). For these addresses to match logically with the functional unit 103, the memory controller 105 can include translation information such that the functional unit 103 and the NVM controller refer to the same address. In an example, an operation to address 10 would be for a first memory device having addresses 0-255. The memory controller 105 directs the operation to the first memory device. An operation for address 512+10, then the memory controller 105 directs the operation to the third memory device. In this manner, the memory controller 105 directs operations to the correct memory device, even though each memory device may be unaware of other memory devices.

When executing the atomic transaction, the processing device 101 can modify data at the atomic buffer 123 instead of at the cache 117. The processing device 101 can allocate the atomic buffer 123 to contain a set of addresses associated with a particular TID as well as write data. Each entry in the atomic buffer 123 can be tied to a specific TID. An example set of entries in the atomic buffer 123 is as follows:

| Address | Data | TID |
|---|---|---|
| 0x5460 | 0x23414234 | 10 |
| 0x2350 | 0x64371737 | 12 |
| 0x7830 | 0x04985929 | 10 |

Executing the atomic transaction using the transaction address buffer 119 segregates addresses updated by the atomic transaction from other functional units. Once the data is written to the atomic buffer 123, the written data can be written to the final address of the NVM media 111.

For another embodiment of a computing system 100, the memory controller 105 can be used with a system on a chip. One embodiment of a system on a chip comprises a processing device and a memory. The memory for one such system is a persistent or non-volatile memory. The persistent or non-volatile memory can be located on the same die as the processor and other system components. Additionally, other logic blocks such as a memory controller or graphics controller can also be located on a system on a chip.

Figure 2A:
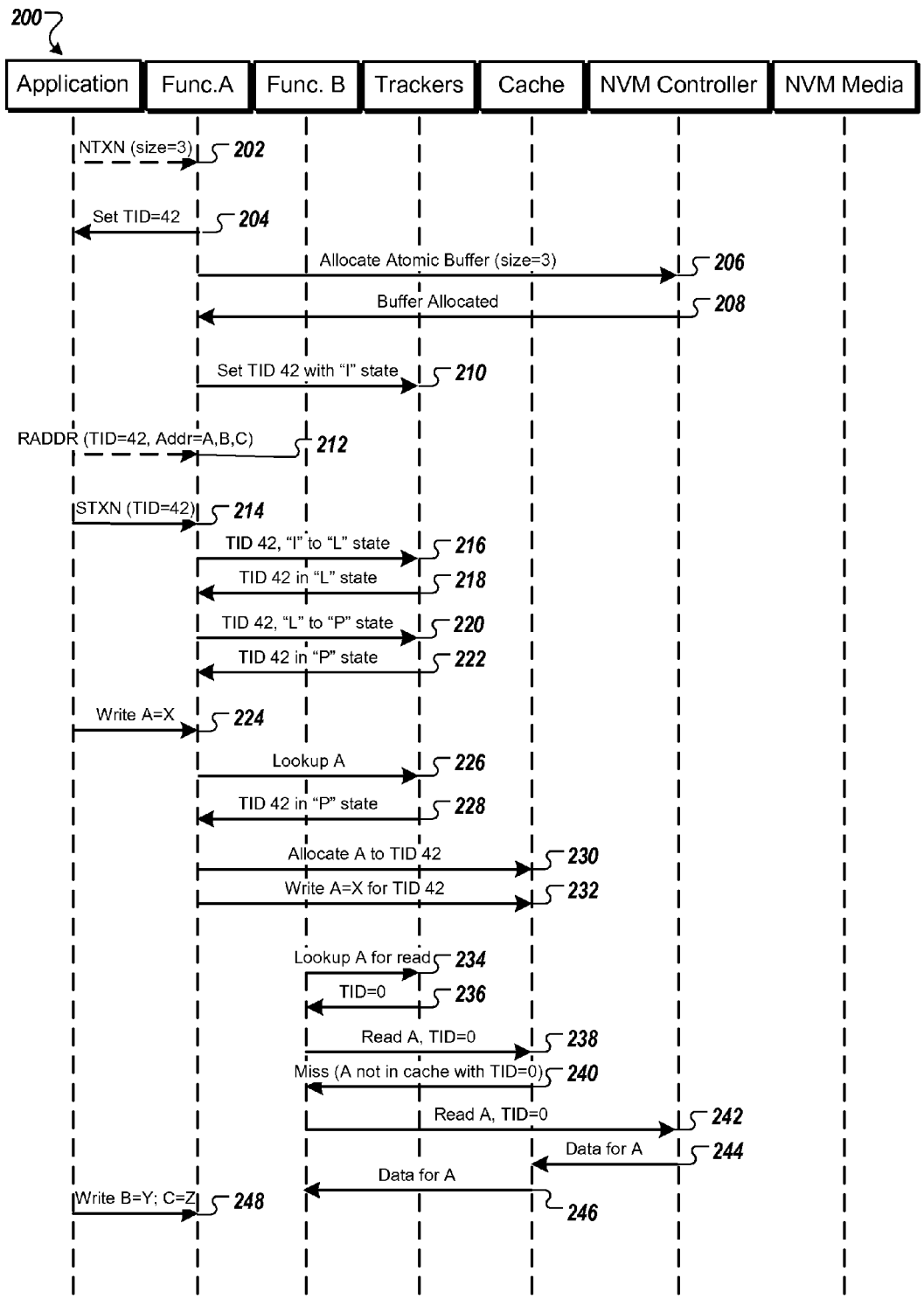
FIGS. 2A-2B illustrate a method for performing an atomic transaction to non-volatile media according to implementations.
Figure 2B:
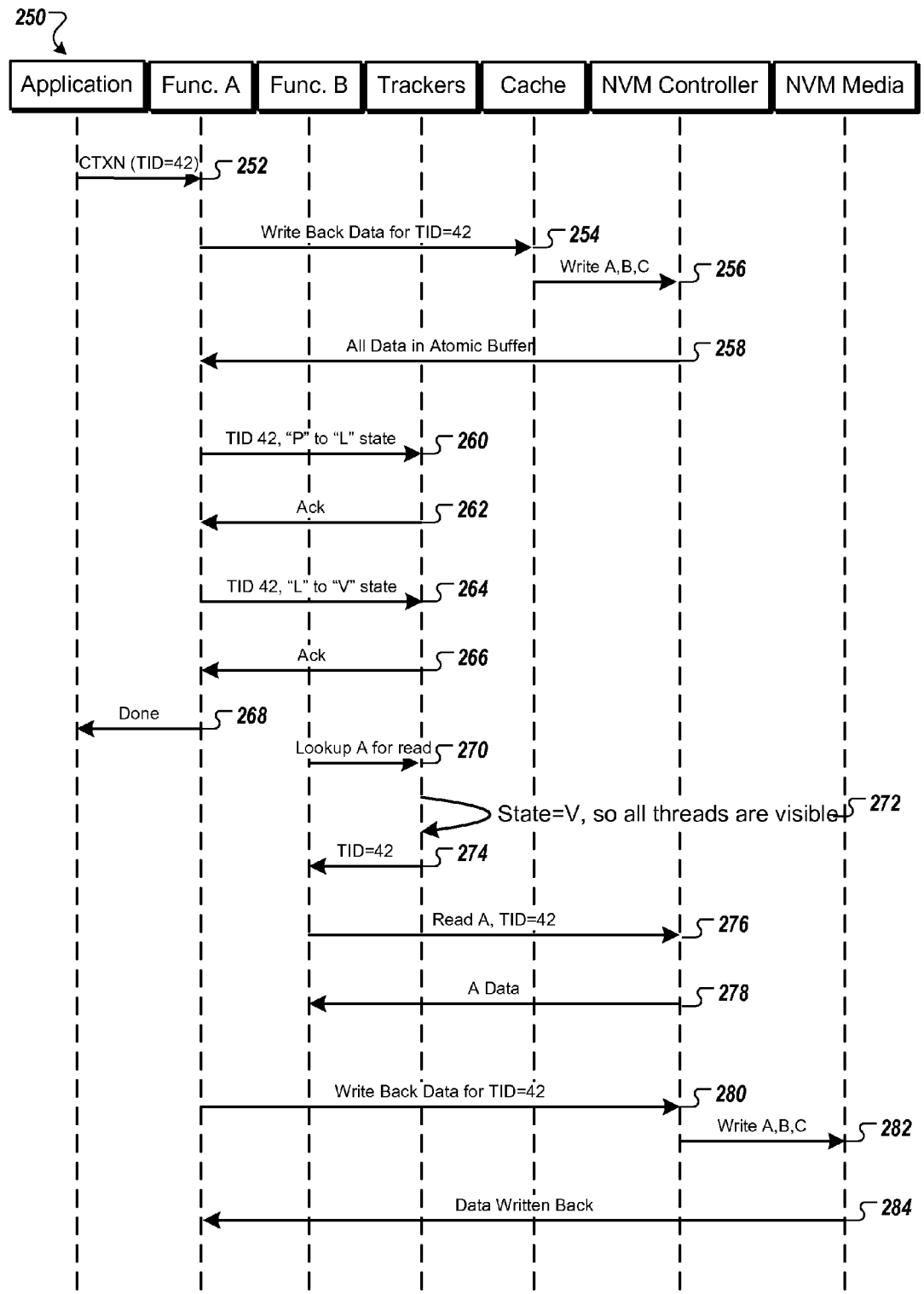

FIGS. 2A-2B illustrate a method for performing an atomic transaction to non-volatile media according to implementations. Method 200 may be performed by processing logic that may comprise hardware (e.g., circuitry, dedicated logic, programmable logic, microcode, etc.), software (such as operations being performed by a functional unit), firmware or a combination thereof. In one embodiment, method 100 is performed by functional unit 103 of FIG. 1. Alternatively, other components of the computing system 100 may perform some or all of the operations of the method 200.

Referring to FIG. 2A, the method 200 begins at 202 by a processing logic (Proc. A) identifying an atomic transaction for non-volatile media. Processing logic can instantiate a new atomic transaction instruction ("NTXN") or can create it in response to receiving a NTXN message from an application (e.g., an application running on the computer system). The NTXN can indicate a particular size of data to be modified atomically, which can refer to a number of addresses, a number of cache pages, a number of cache lines (e.g., contiguous or non-contiguous), etc. to change during the execution of the atomic transaction. For example, the NTXN can indicate a size of "3," which can mean the atomic transaction is to update 3 addresses of NVM media (e.g., NVM media 111 of FIG. 1). At 204, the processing logic sets a transaction ID (TID) in a transaction tracker (e.g., transaction tracker 121) for the atomic transaction. In the example, the TID for the atomic transaction is "42."

At 206, processing logic communicates with a NVM controller (e.g., NVM controller 109 of FIG. 1) to allocate an atomic buffer for the TID of the size that is large enough to handle the transaction. In response to receiving this communication to allocate the atomic buffer, the NVM controller can also begin tracking the TID. At 208, the NVM controller communicates with the processing logic that the atomic buffer has been allocated. If the NVM controller cannot allocate a buffer of sufficient size to handle the transaction, the NVM controller can respond to the processing logic that it cannot handle the transaction.

At 210, processing logic sets the TID with an "Invalid" state in the transaction tracker (e.g., transaction trackers 113 and 121 of FIG. 1). The invalid state can indicate that either there is no transaction in process or the transaction is not valid. An atomic transaction can be invalid at various points in time, such as when it was just created, not yet started or already completed. At 212, processing logic can register the addresses to be modified during execution of the atomic transaction. In an example, processing logic registers addresses A, B and C and associates these addresses with the TID in the transaction tracker. In implementations, the processing logic can register the addresses to be modified in response to receiving an instruction (e.g., a register address "RADDR" instruction). Processing logic can register the addresses in response to receiving a registration message from the application. In other implementations, processing logic can automatically register the addresses. When registering the addresses, processing logic can mark addresses to be written as "write set" and addresses to be read as "read set."

At 214, processing logic prepares for execution of the atomic transaction, which is indicated as "STXN." To begin executing the atomic transaction, the TID should be in the "processing" state. In implementations, processing logic moves the state of the addresses associated with the TID to "processing" in two phases to ensure that all transaction trackers in the system transition to the same state uniformly. At 216, processing logic instructs each tracker to change the state of the addresses associated with the TID from "invalid" to "locked." When an address is locked, any functional unit or thread that reads or writes to the address will be blocked until the address is unlocked. Addresses can be locked in groups of addresses or by address ranges. The transaction trackers can lock the addresses in parallel or at the concurrently. In implementations, processing logic can omit the first phase of locking the TID or addresses associated with the TID such that the state transitions from "invalid" to "processing." During the processing state, the address is currently being updated. Updated data is not visible to other functional unit or threads.

After each transaction tracker indicates that the TID is in a "locked" state at 218, processing logic then instructs each transaction tracker to change the state of the TID to a "processing" state at 220. At 222, each transaction tracker indicates that the state of the TID is in the "processing" state.

At 224, processing logic receives an instruction to write to a particular address. For example, processing logic receives an instruction to write "X" to address "A." At 226, processing logic performs a lookup of the target address in the transaction tracker to determine if that address is associated with the TID. If the address is associated with the TID and in a "processing" state, then processing logic can begin writing to that address. If the address is associated with another TID, then in one implementation, the atomic transaction can terminate. In another implementation, if the address is associated with another TID, the atomic transaction can continue with processing.

At 230, the CPU cache is extended to the TID such that addresses that are accessed during the atomic transaction can also be read by another functional unit. The cache can store two sets of data for each address—one for the atomic transaction and an old value for other transactions. The cache can include a table to track which data to use or return for a particular TID. An example cache table can be as follows:

| Address | Data | TID |
| --- | --- | --- |
| 0x1234 | 0xdeadbeef | 10 |
| 0x1234 | 0x38942047 | 0 |

The cache returns a value depending on the TID of the transaction. For example, if a read of an updated address is part of an atomic transaction (e.g., TID=10), the cache will return the new value instead of the old value. A second functional unit, for example, may perform a read for the same address, but since the second functional unit does not have the TID attribute in the read request, the old data will be returned from the cache. At 232, data is written to the target address (e.g., "X" is written to "A" in the cache). In implementations, a TID=0 indicates that the address is not associated with a transaction. If a functional unit other than the one performing the transaction (e.g., the second functional unit) attempts to perform a write, the second functional unit first looks up the address in the transaction tracker. The second functional unit will discover that the first functional unit is performing a transaction on this TID, and then can receive a fault or error message because there would be multiple functional units attempting to modify the same data for the same address if the second functional unit were allowed to modify the data.

Items 234-246 indicate how the cache and NVM controller handle read requests from another processing logic (Proc. B) to the addresses that are associated with the TID. If another functional unit does a read to an address that is also part of a transaction, processing logic can read allocate a copy into cache and mark the data and address with TID=0 to indicate that it is not part of any transaction. In this manner, both transactions' data lines can be cached as well as old data that is not part of the transaction. The TID is what distinguishes these lines in the cache. Each read request and write request can include a TID to ensure the correct data is returned.

At 234, Proc. B performs a lookup for address A for a read. The cache returns a TID=0, which indicates that the address is not valid and the cache does not have the value. Proc. B is to obtain the value from the NVM media. To obtain the data from the NVM media, Proc. B communicates with a NVM controller of the NVM media at 242 using a read request. At 244, the NVM controller returns the value to the cache and at 246, the cache returns the value to Proc.

B. In implementations, Proc. B receives the value directly from the NVM controller. In this implementation, the cache can be updated concurrently.

At 248, the remaining addresses can be updated in a manner similar to what was described above.

FIG. 2B continues from FIG. 2A. At block 252, the application issues a commit transaction notification ("CTXN"). Upon receiving a CTXN, processing logic can initiate a completion or commit of the atomic transaction. At 254, processing logic performs a writeback of the data for the TID to the cache. At 254, processing logic moves the data from the cache to an atomic buffer of the NVM controller. In some implementations, instead of writing to a cache in 232, processing logic writes directly to an atomic buffer associated with the NVM controller at 254 and omits 256. At 258, the NVM controller indicates to the processing logic that all of the data was written to the atomic buffer.

Once the processing logic receives an indication that all of the data was written to the atomic buffer, processing logic instructs the transaction trackers to change the state of the TID from "processing" to "locked." At 262, processing logic receives an acknowledgement that the state of the TID was updated from "processing" to "locked." This locks the transaction so that no functional unit can read or write any of the addresses that are part of the atomic transaction. Any functional unit that tries to access the address in this range will be blocked until the TID is unlocked. This avoids a situation where two trackers have different states for the same TID, such as if one tracker had "processing" state for a TID and another tracker had a "valid" state for the same TID. At 264, once processing logic has received an acknowledgement from all of the trackers that the state of the TID was updated from "processing" to "locked," processing logic instructs the trackers to change the state of the TID from "locked" to "valid." The "valid" state can be entered after a commit of the data modified during the atomic transaction. Any functional unit can see the updated data and the old data is no longer visible. Once the NVM controller receives the "locked" to "valid" message, the NVM controller will begin to write the data back to the atomic buffer. At 266, the processing logic receives an acknowledgement that the state of the TID was updated from "locked" to "valid." At 268, the processing logic indicates to the application that the atomic transaction is complete. At this point, any functional unit can request to modify the data that was updated by the atomic transaction. The processing logic can first check the cache for the requested data. If there is a cache hit, then the data can be returned. If there is a cache miss, then the data can be retrieved from the atomic buffer.

Items 270-278 illustrate how read requests from a different functional unit (func.B) are handled after the atomic transaction is complete and while the data is in the atomic buffer but before the data has been written to the NVM media. At 270, func.B performs a lookup of address "A" in the transaction trackers. Since the state of the addresses is "valid," the addresses are visible and the updated data is readable. The transaction trackers can inform func.B that the address is associated with a particular TID at 274. At 276, func.B communicates a read request to the atomic buffer of the NVM controller and at 278, the NVM controller returns the data from the atomic buffer to func.B.

Once the atomic transaction is complete and is visible to all functional units, the next step is to tear down the TID, remove any old data that may still be in cache, write the atomic buffer back to the NVM and release the atomic buffer. At 280, the processing logic instructs the NVM controller to write the data from the atomic buffer to the NVM media. At 282, the NVM controller writes the data from the atomic buffer to the NVM media. At 284, the processing logic receives a notification that the data was written to the NVM media. For example, the processing logic can receive this notification from the NVM media or from the NVM controller. The processing logic can also cause the CPU cache to clean out the old data, such as by invalidating stale cache lines. First, all the old lines are removed from the cache. Then, the lines that were part of the atomic transaction can be changed to set the TID field to zero (0). As described above, a TID=0 can mean global visibility. Once the cache has been cleaned out, the TID of the atomic transaction can be removed from the transaction tracker and the addresses or address range associated with the TID can be disassociated from the TID.

Figure 3:
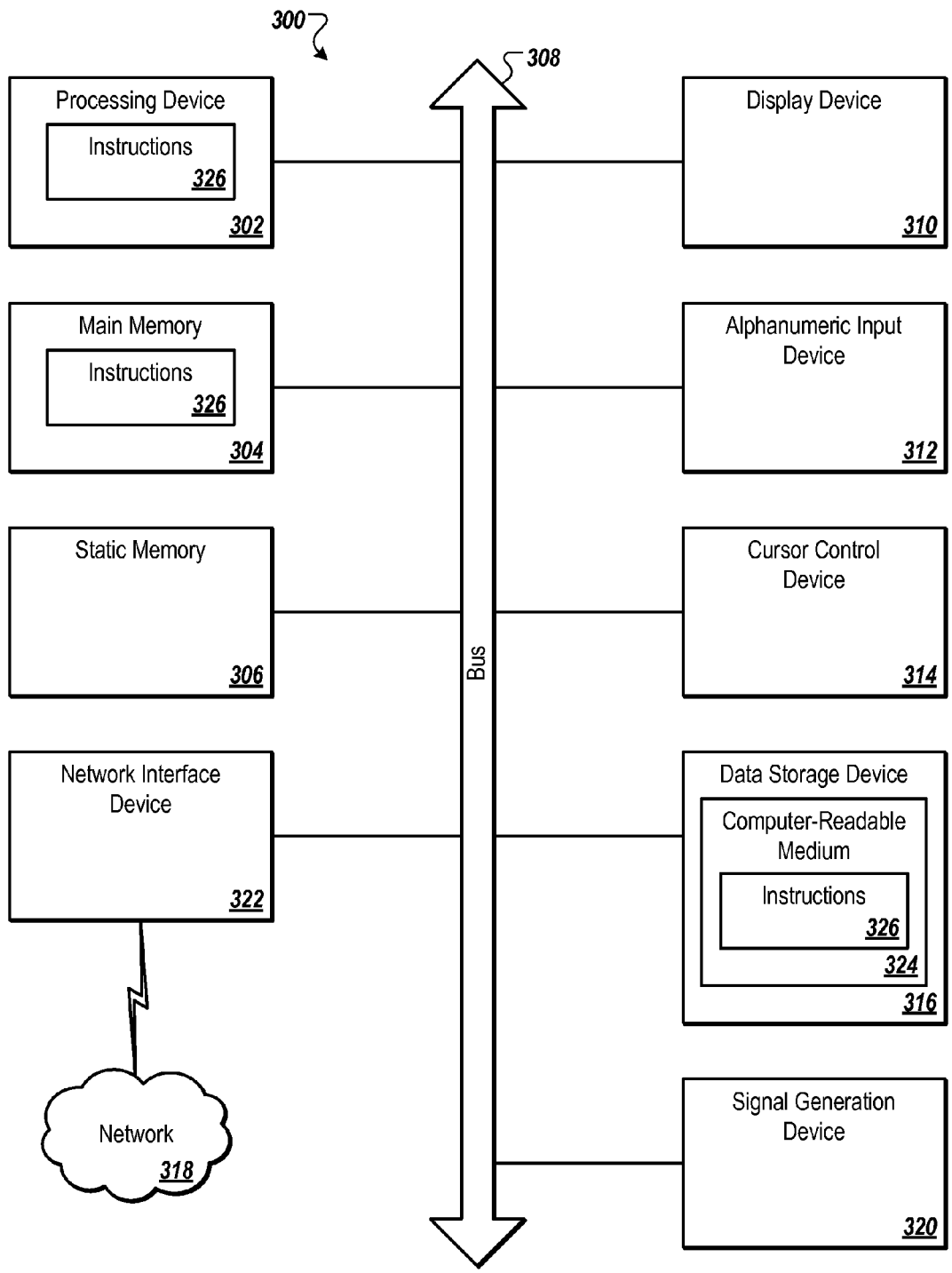
FIG. 3 illustrates a diagrammatic representation of a machine in the example form of a computing system according to implementations.

FIG. 3 illustrates a diagrammatic representation of a machine in the example form of a computing system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 300 includes a processing device 302, main memory 304 (e.g., read-only memory (ROM), flash memory, dynamic random access memory (DRAM) (such as synchronous DRAM (SDRAM) or DRAM (RDRAM), etc.), a static memory 306 (e.g., flash memory, static random access memory (SRAM), etc.), and a data storage device 316, which communicate with each other via a bus 308.

Processing device 302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. In one embodiment, processing device 302 may include one or processing cores. The processing device 302 is configured to execute the processing logic 326 for performing the operations discussed herein. In one embodiment, processing device 302 can be part of the computing system 100 of FIG. 1. Alternatively, the computing system 300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 300 may further include a network interface device 322 communicably coupled to a network 318. The computing system 300 also may include a display device 310 (e.g., a liquid crystal display (LCD) or a cathode ray tube (CRT)), an alphanumeric input device 312 (e.g., a keyboard), a cursor control device 314 (e.g., a mouse), a signal generation device 320 (e.g., a speaker), or other peripheral devices. Furthermore, computing system 300 may include a graphics processing unit (not illustrated), a video processing unit (not illustrated) and an audio processing unit (not illustrated). In another embodiment, the computing system 300 may include a chipset (not illustrated), which refers to a group of integrated circuits, or chips, that are designed to work with the processing device 302 and controls communications between the processing device 302 and external devices. For example, the chipset may be a set of chips on a motherboard that links the processing device 302 to very high-speed devices, such as main memory 304 and graphic controllers, as well as linking the processing device 302 to lower-speed peripheral buses of peripherals, such as USB, PCI or ISA buses.

The data storage device 316 may include a computer-readable storage medium 324 on which is stored instructions 326 embodying any one or more of the methodologies of functions described herein. The instructions 326 may also reside, completely or at least partially, within the main memory 304 as instructions 326 and/or within the processing device 302 as processing logic 326 during execution thereof by the computing system 300; the main memory 304 and the processing device 302 also constituting computer-readable storage media.

The computer-readable storage medium 324 may also be used to store instructions 326 utilizing the processing device 302, such as described with respect to FIG. 1, and/or a software library containing methods that call the above applications. While the computer-readable storage medium 324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Figure 4:
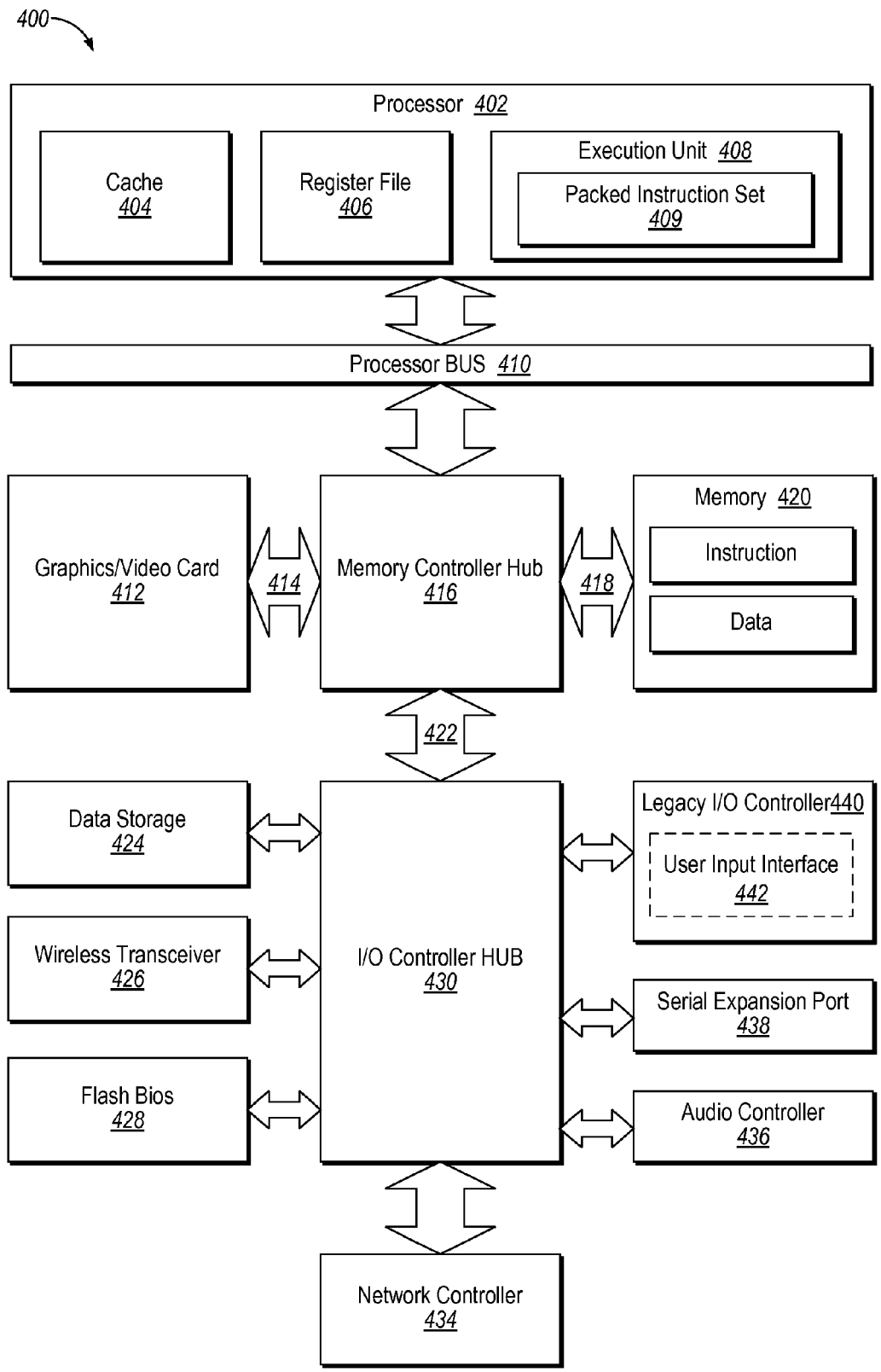
FIG. 4 is a block diagram of an exemplary computer system according to implementations.

Turning to FIG. 4, a block diagram of an exemplary computer system formed with a processor that includes execution units to execute an instruction, where one or more of the interconnects implement one or more features in accordance with one embodiment of the present invention is illustrated. System 400 includes a component, such as a processor 402 to employ execution units including logic to perform algorithms for processing data, in accordance with the embodiment described herein. System 400 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 400 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 402 includes one or more execution units 408 to implement an algorithm that is to perform at least one instruction. One embodiment may be described in the context of a single processor desktop or server system, but alternative embodiments may be included in a multiprocessor system. System 400 is an example of a 'hub' system architecture. The computer system 400 includes a processor 402 to process data signals. The processor 402, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 402 is coupled to a processor bus 410 that transmits data signals between the processor 402 and other components in the system 400. The elements of system 400 (e.g. graphics accelerator 412, memory controller hub 416, memory 420, I/O controller hub 424, wireless transceiver 426, Flash BIOS 428, Network controller 434, Audio controller 436, Serial expansion port 438, I/O controller 430, etc.) perform their conventional functions that are well known to those familiar with the art.

In one embodiment, the processor 402 includes a Level 1 (L1) internal cache memory 404. Depending on the architecture, the processor 402 may have a single internal cache or multiple levels of internal caches. Other embodiments include a combination of both internal and external caches depending on the particular implementation and needs. Register file 406 is to store different types of data in various registers including integer registers, floating point registers, vector registers, banked registers, shadow registers, checkpoint registers, status registers, and instruction pointer register.

Execution unit 408, including logic to perform integer and floating point operations, also resides in the processor 402. The processor 402, in one embodiment, includes a microcode (ucode) ROM to store microcode, which when executed, is to perform algorithms for certain macroinstructions or handle complex scenarios. Here, microcode is potentially updateable to handle logic bugs/fixes for processor 402. For one embodiment, execution unit 408 includes logic to handle a packed instruction set 409. By including the packed instruction set 409 in the instruction set of a general-purpose processor 402, along with associated circuitry to execute the instructions, the operations used by many multimedia applications may be performed using packed data in a general-purpose processor 402. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 408 may also be used in micro controllers, embedded processors, graphics devices, DSPs, and other types of logic circuits. System 400 includes a memory 420. Memory 420 includes a dynamic random access memory (DRAM) device, a static random access memory (SRAM) device, flash memory device, or other memory device. Memory 420 stores instructions and/or data represented by data signals that are to be executed by the processor 402.

A system logic chip 416 is coupled to the processor bus 410 and memory 420. The system logic chip 416 in the illustrated embodiment is a memory controller hub (MCH). The processor 402 can communicate to the MCH 416 via a processor bus 410. The MCH 416 provides a high bandwidth memory path 418 to memory 420 for instruction and data storage and for storage of graphics commands, data and textures. The MCH 416 is to direct data signals between the processor 402, memory 420, and other components in the system 400 and to bridge the data signals between processor bus 410, memory 420, and system I/O 422. In some embodiments, the system logic chip 416 can provide a graphics port for coupling to a graphics controller 412. The MCH 416 is coupled to memory 420 through a memory interface 418. The graphics card 412 is coupled to the MCH 416 through an Accelerated Graphics Port (AGP) interconnect 414.

System 400 uses a proprietary hub interface bus 422 to couple the MCH 416 to the I/O controller hub (ICH) 430. The ICH 430 provides direct connections to some I/O devices via a local I/O bus. The local I/O bus is a high-speed I/O bus for connecting peripherals to the memory 420, chipset, and processor 402. Some examples are the audio controller, firmware hub (flash BIOS) 428, wireless transceiver 426, data storage 424, legacy I/O controller containing user input and keyboard interfaces, a serial expansion port such as Universal Serial Bus (USB), and a network controller 434. The data storage device 424 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 5:
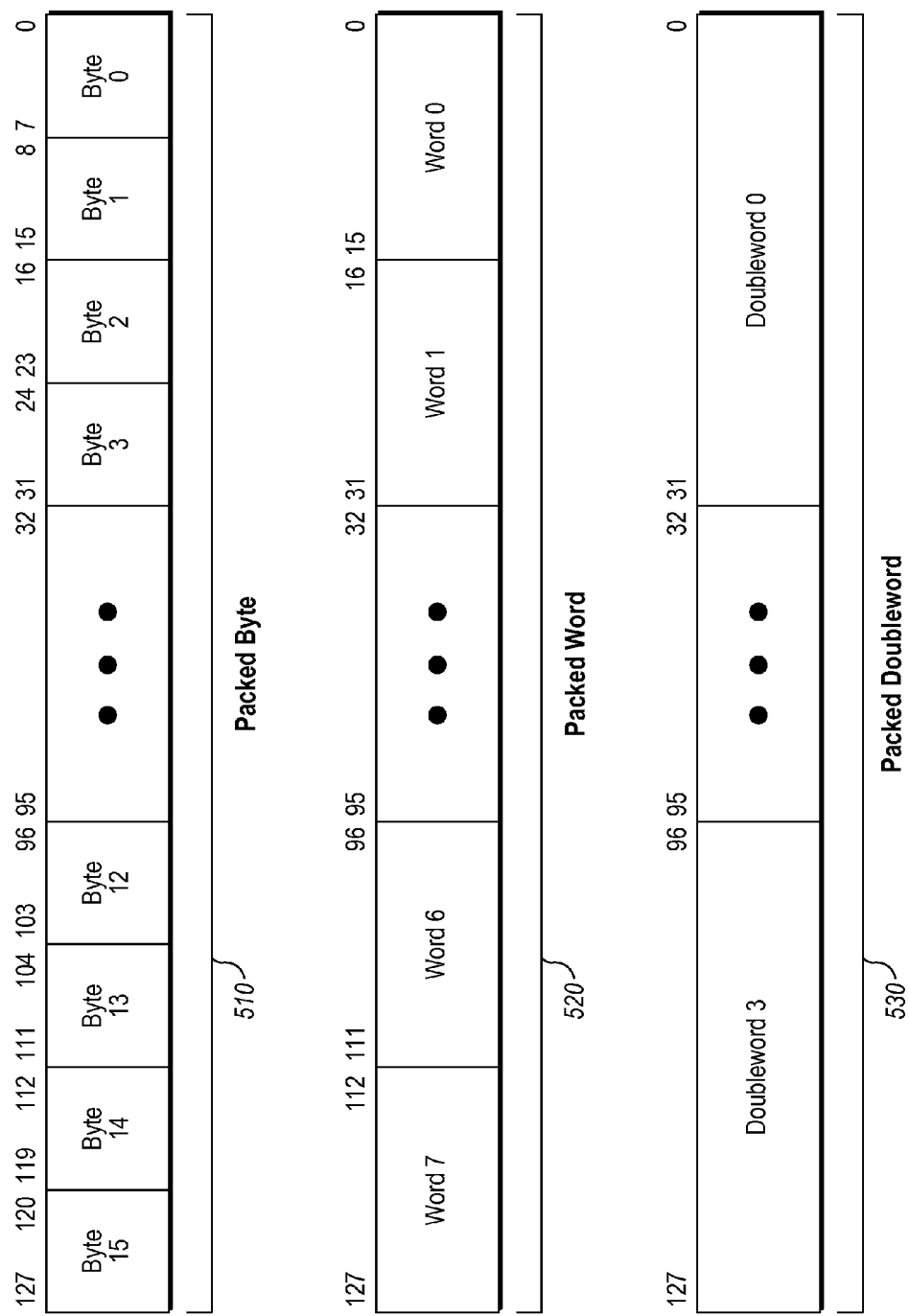
FIG. 5 illustrates packed data types according to implementations.

FIG. 5 illustrates various packed data type representations in multimedia registers according to one embodiment of the present invention. FIG. 5 illustrates data types for a packed byte 510, a packed word 520, and a packed doubleword (dword) 530 for 128 bits wide operands. The packed byte format 510 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 5 are 128 bit long, embodiments of the present invention can also operate with 64 bit wide or other sized operands. The packed word format 520 of this example is 128 bits long and contains eight packed word data elements. Each packed word contains sixteen bits of information. The packed doubleword format 530 of FIG. 5 is 128 bits long and contains four packed doubleword data elements. Each packed doubleword data element contains thirty two bits of information. A packed quadword is 128 bits long and contains two packed quad-word data elements.

FIG. 6A is a block diagram illustrating an in-order pipeline and a register renaming stage, out-of-order issue/execution pipeline according to at least one embodiment of the invention. FIG. 6B is a block diagram illustrating an in-order architecture core and a register renaming logic, out-of-order issue/execution logic to be included in a processor according to at least one embodiment of the invention. The solid lined boxes in FIG. 6A illustrate the in-order pipeline, while the dashed lined boxes illustrates the register renaming, out-of-order issue/execution pipeline. Similarly, the solid lined boxes in FIG. 6B illustrate the in-order architecture logic, while the dashed lined boxes illustrates the register renaming logic and out-of-order issue/execution logic.

In FIG. 6A, a processor pipeline 500 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

In FIG. 6B, arrows denote a coupling between two or more units and the direction of the arrow indicates a direction of data flow between those units. FIG. 6B shows processor core 690 including a front end unit 630 coupled to an execution engine unit 650, and both are coupled to a memory unit 670.

The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to a level 2 (L2) cache unit 676 in the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 162 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The L2 cache unit 676 is coupled to one or more other levels of cache and eventually to a main memory.

By way of example, the exemplary register renaming, out-of-order issue/execution core architecture may implement the pipeline 500 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
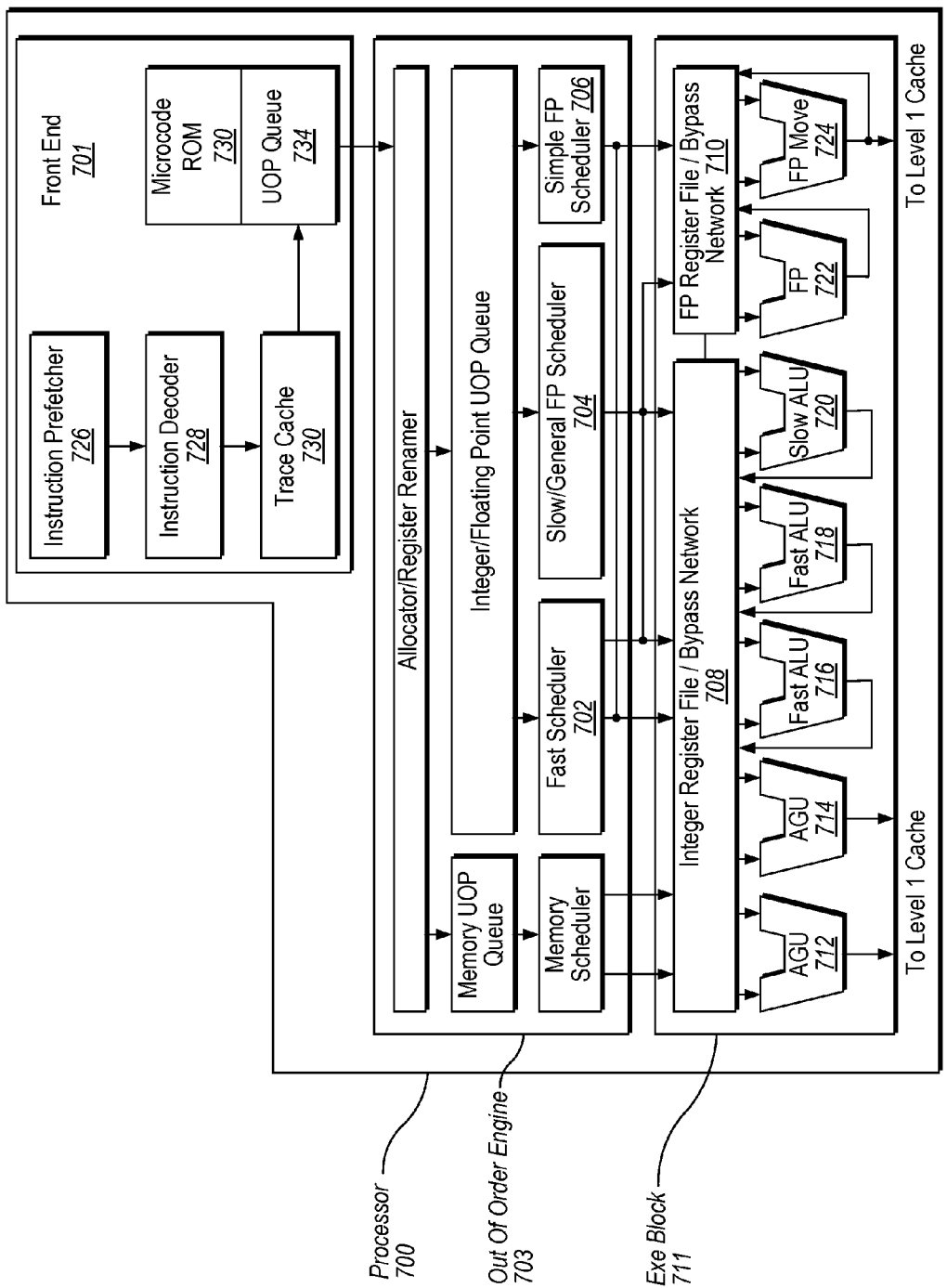
FIG. 7 is a block diagram of a processor according to implementations.

FIG. 7 is a block diagram of the micro-architecture for a processor 700 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706 determine when a uop is ready to execute based on the readiness of their dependent input register operand sources and the availability of the execution resources the uops need to complete their operation. The fast scheduler 702 of one embodiment can schedule on each half of the main clock cycle while the other schedulers can schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file 708, 710 for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720 are described in the context of performing integer operations on 64 bit data operands. In alternative embodiments, the ALUs 716, 718, 720 can be implemented to support a variety of data bits including 16, 32, 128, 756, etc. Similarly, the floating point units 722, 724 can be implemented to support a range of operands having bits of various widths. For one embodiment, the floating point units 722, 724 can operate on 128 bits wide packed data operands in conjunction with SIMD and multimedia instructions.

In one embodiment, the uops schedulers 702, 704, 706 dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
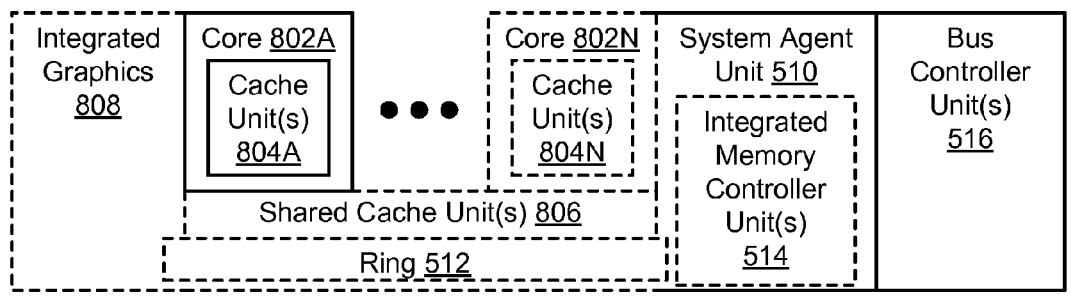
FIG. 8 is a block diagram of a processor according to implementations.

FIG. 8 is a block diagram of a single core processor and a multicore processor 800 with integrated memory controller and graphics according to embodiments of the invention. The solid lined boxes in FIG. 8 illustrate a processor 800 with a single core 802A, a system agent 810, a set of one or more bus controller units 816, while the addition of the dashed lined boxes illustrates an alternative processor 800 with multiple cores 802A-N, a set of one or more integrated memory controller unit(s) 814 in the system agent unit 810, and an integrated graphics logic 808.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810, alternative embodiments may use any number of well-known techniques for interconnecting such units.

In some embodiments, one or more of the cores 802A-N are capable of multi-threading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 800 may be a part of and/or may be implemented on one or more substrates using any of a number of process technologies, such as, for example, BiCMOS, CMOS, or NMOS.

Figure 9:
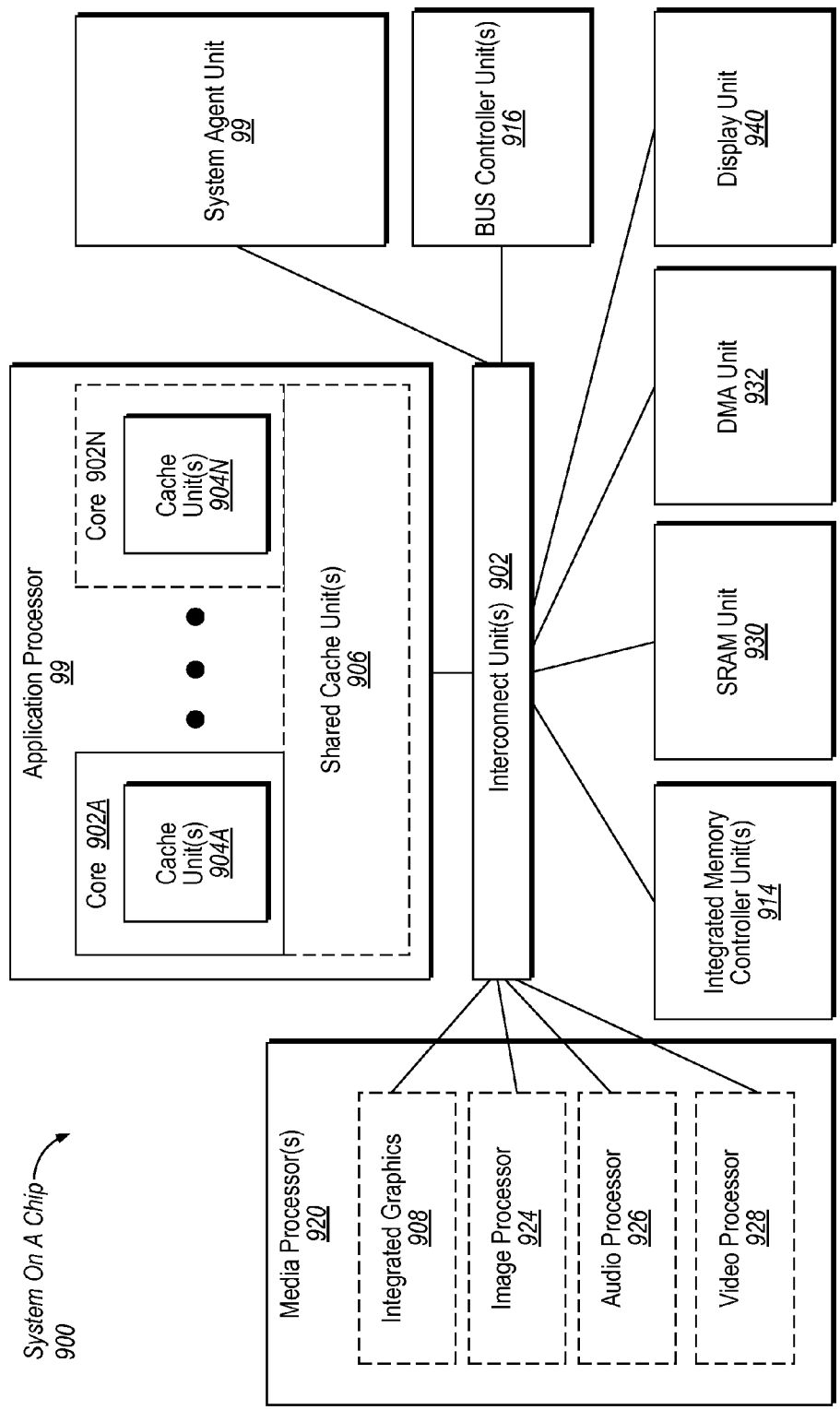
FIG. 9 is a block diagram of a system-on-a-chip according to implementations.

Referring now to FIG. 9, shown is a block diagram of a SoC 900 in accordance with an embodiment of the present invention. Similar elements in FIG. 5 bear like reference numerals. Also, dashed lined boxes are features on more advanced SoCs. In FIG. 9, an interconnect unit(s) 902 is coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
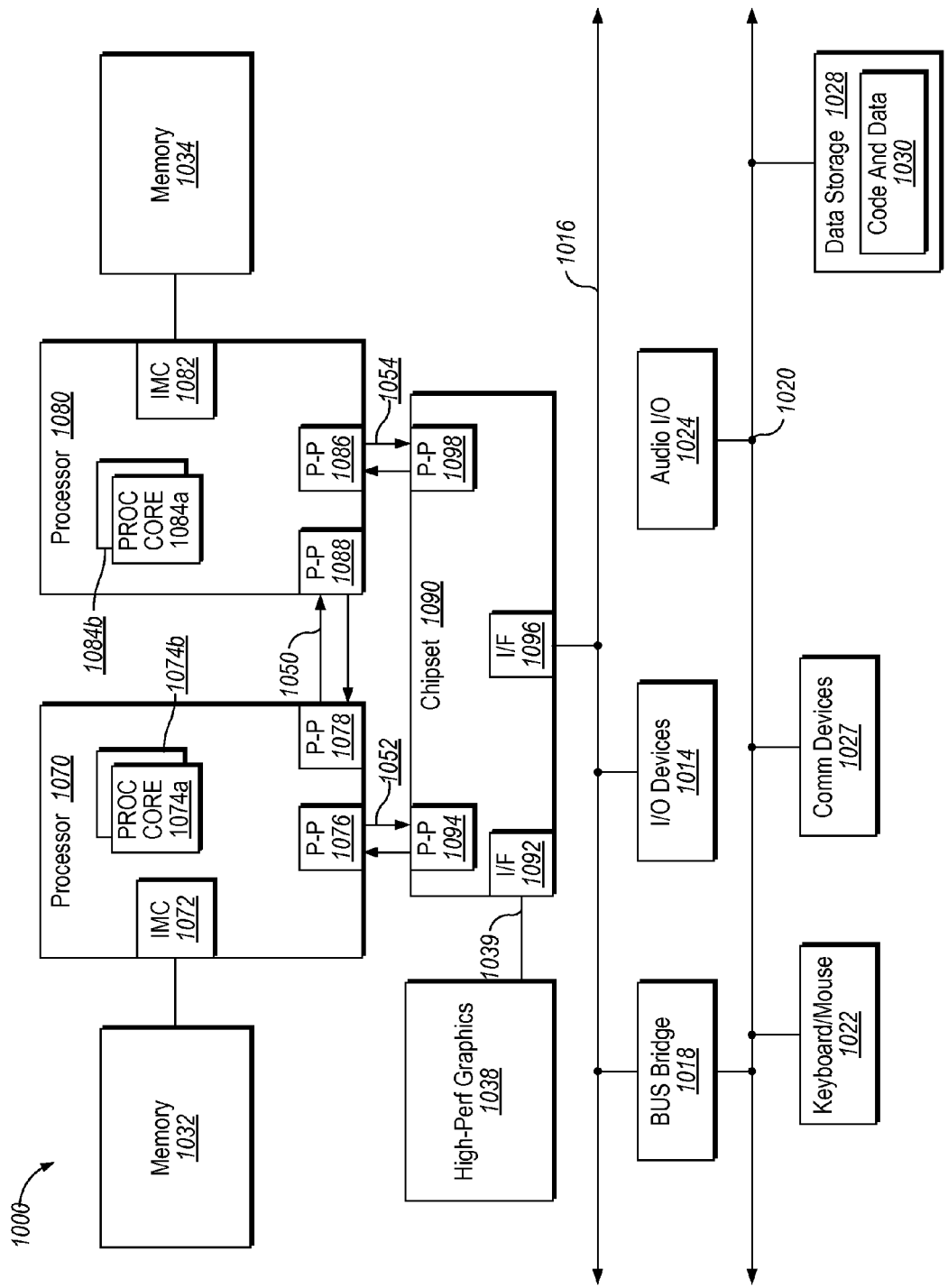
FIG. 10 is a block diagram of a computer system according to implementations.

Embodiments may be implemented in many different system types. Referring now to FIG. 10, shown is a block diagram of a multiprocessor system 1000 in accordance with an implementation. As shown in FIG. 10, multiprocessor system 1000 is a point-to-point interconnect system, and includes a first processor 1070 and a second processor 1080 coupled via a point-to-point interconnect 1050. As shown in FIG. 10, each of processors 1070 and 1080 may be multicore processors, including first and second processor cores (i.e., processor cores 1074a and 1074b and processor cores 1084a and 1084b), although potentially many more cores may be present in the processors. The processors each may include hybrid write mode logics in accordance with an embodiment of the present.

While shown with two processors 1070, 1080, it is to be understood that the scope of the present disclosure is not so limited. In other implementations, one or more additional processors may be present in a given processor.

Processors 1070 and 1080 are shown including integrated memory controller units 8102 and 8102, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to second bus 1020. Note that other architectures are possible. For example, instead of the point-to-point architecture of FIG. 10, a system may implement a multi-drop bus or other such architecture.

Figure 11:
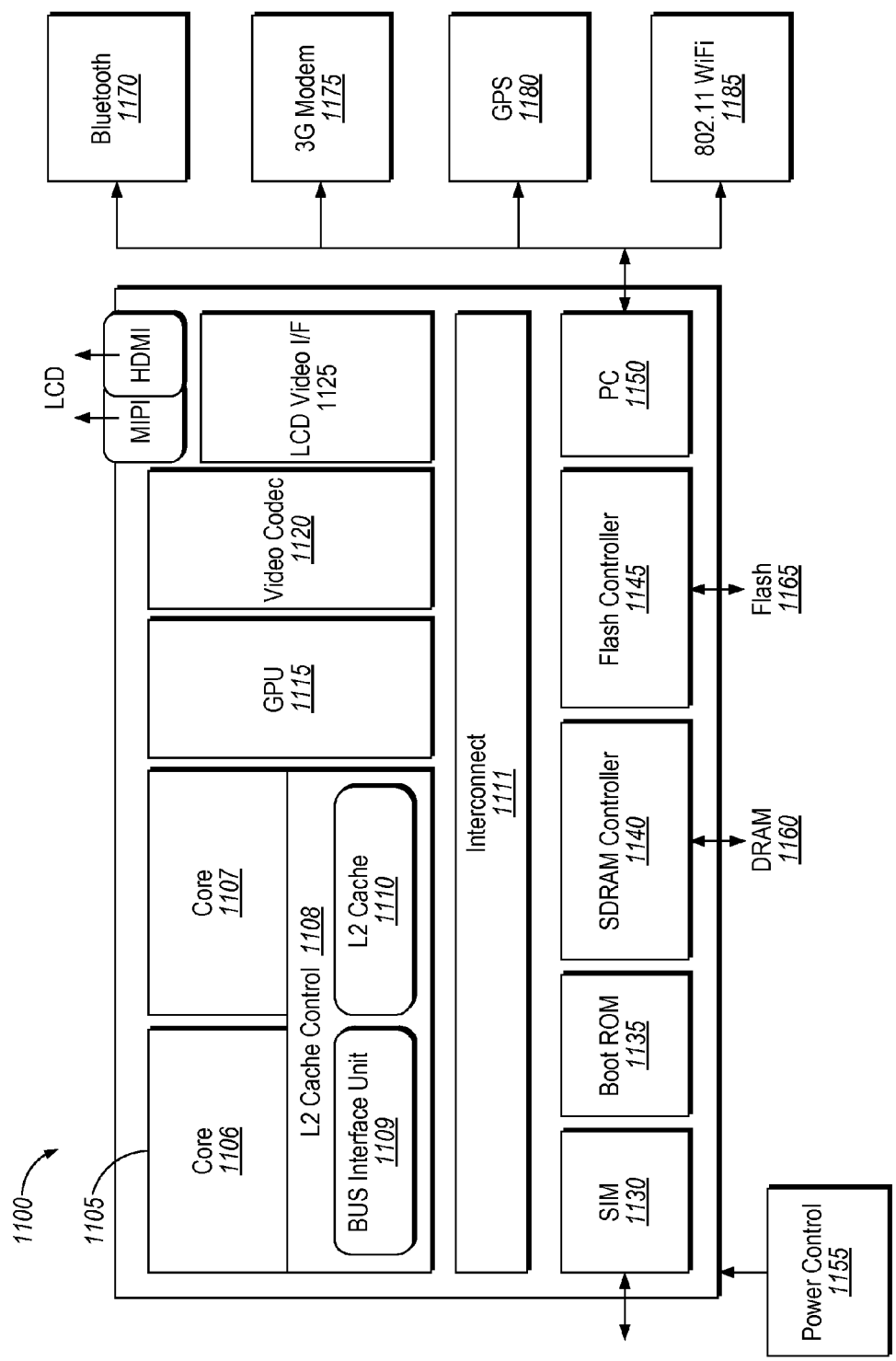
FIG. 11 illustrates another implementation of a block diagram for a computing system.

Turning next to FIG. 11, an embodiment of a system on-chip (SOC) design in accordance with embodiments of the invention is depicted. As an illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SOC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot rom 1135 to hold boot code for execution by cores 1106 and 1107 to initialize and boot SOC 1100, a SDRAM controller 1140 to interface with external memory (e.g. DRAM 1160), a flash controller 1145 to interface with persistent or non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and WiFi 1185. Note as stated above, a UE includes a radio for communication. As a result, these peripheral communication modules may not all be included. However, in a UE some form of a radio for external communication should be included.

The embodiments described below are directed to a mechanism for continuous automatic tuning of code regions. The mechanism can be used for a code region to identify and use an optimal hardware (HW) configuration for the code region. As described above, processor parameters can be set at manufacturing, at system boot time or at runtime, and can be permanently set to be compatible with a wide variety of applications.

The embodiments described below implement two new instructions that can be used to: 1) demarcate a code region for measurement (e.g., instructions-per-cycle (IPC) calculation, power-consumption metric, or the like); and/or 2) automatically adjust the tunable parameters for the demarcated region by calculating the measurement (e.g., IPC) of the code region for different sets of tunable parameters and selecting a set of tunable parameters with the highest measurement (e.g., highest IPC) or, in some cases, the lowest measurements (e.g., lowest energy consumption or lowest power consumption). Automatically adjusting and automatically tuning, as used herein, indicate that the tunable parameters for the demarcated region can be adjusted without user intervention to make those adjustments.

The following examples pertain to further embodiments.

Example 1 is a processing device comprising: 1) an interface to a non-volatile storage medium; and 2) a first functional unit to perform a plurality of instructions associated with an atomic transaction, wherein the plurality of instructions are to update data at a set of addresses in the non-volatile storage medium atomically, wherein the first functional unit is operable to: a) perform a first instruction to create the atomic transaction that declares a size of the data to be updated atomically, b) perform a second instruction to start execution of the atomic transaction; and c) perform a third instruction to commit the atomic transaction to the set of addresses in the non-volatile storage medium, wherein the updated data is not visible to other functional units of the processing device until the atomic transaction is complete.

In Example 2, in the processing device of Example 1, during performance of the first instruction, the first functional unit is further operable to change a state of the set of addresses to an invalid state after creating the atomic transaction.

In Example 3, in the processing device of any of Examples 1-2, before performance of the second instruction, the first functional unit is further operable to perform a fourth instruction to register the set of addresses to be modified during the atomic transaction in a transaction tracker.

In Example 4, in the processing device of any of Examples 1-3, before performance of the second instruction, the first functional unit is further operable to change a state of the set of addresses to a locked state, and change the state of the set of addresses from the locked state to a processing state when the states of each of the set of addresses are in the locked state to start execution of the atomic transaction.

In Example 5, in the processing device of any of Examples 1-4, during performance of the third instruction, the first functional unit is further operable to write the data for the set of addresses to an intermediate memory location before committing the data for the set of addresses to the non-volatile storage medium, and wherein the first functional unit is to lock the set of addresses after writing the data for the set of addresses to the intermediate memory location and before committing the data for the set of addresses to the non-volatile storage medium.

In Example 6, in the processing device of any of Examples 1-5, during performance of the third instruction, the first functional unit is further operable to change a state of the set of addresses to a visible state to unlock the set of addresses after the atomic transaction has been committed to the set of addresses in the non-volatile storage medium.

In Example 7, in the processing device of any of Examples 1-6, the intermediate memory location is a memory element in a cache, wherein during performance of the third instruction, the functional unit is further to write the data from the cache to a buffer of the non-volatile storage medium while the set of addresses are in a locked state; and unlock the set of addresses when the data is written from the cache to the buffer of the non-volatile storage medium.

In Example 8, in the processing device of any of Examples 1-7, the cache is operable to store two sets of data for a respective one of the set of address of the non-volatile storage medium.

In Example 9, in the processing device of any of Examples 1-8, a first set of the two sets of data is associated with the atomic transaction, wherein a second set of the two sets of data contains data that existed before the functional unit created the atomic transaction.

In Example 10, the processing device of any of Examples 1-9, includes a second functional unit that is operable to execute a thread, wherein the second set of data is returned to the second functional unit when the thread requests to access one of the set of addresses associated with the atomic transaction.

In Example 11, in the processing device of any of Examples 1-10, writing the data for the set of addresses to the non-volatile storage medium of the third instruction comprises writing the data to a buffer of the non-volatile storage medium.

In Example 12, in the processing device of any of Examples 1-11, the first functional unit is further operable to write the data from the buffer of the non-volatile storage medium to a set of addresses of the non-volatile storage medium.

In Example 13, in the processing device of any of Examples 1-12, the first functional unit is further to track the atomic transaction using a transaction identifier (TID).

In Example 14, in the processing device of any of Examples 1-13, the first functional unit is further operable to invalidate the TID after the atomic transaction has been committed.

In Example 15, in the processing device of any of Examples 1-14, the non-volatile storage medium is byte-addressable.

Various embodiments may have different combinations of the structural features described above. For instance, all optional features of the computing system described above may also be implemented with respect to the method or process described herein and specifics in the examples may be used anywhere in one or more embodiments.

Example 16 is an apparatus comprising a non-volatile memory; and a processor coupled to the non-volatile memory, wherein the processor is configured to execute a first functional unit to perform a plurality of instructions associated with an atomic transaction, wherein the plurality of instructions are to update data at a set of addresses in the non-volatile memory atomically, wherein the first functional unit is operable to perform a first instruction to create the atomic transaction that declares a size of the data to be updated atomically, perform a second instruction to start execution of the atomic transaction; and perform a third instruction to commit the atomic transaction to the set of addresses in the non-volatile memory, wherein the updated data is not visible to other functional units of the processing device until the atomic transaction is complete.

In Example 17, in the apparatus of Example 16, during performance of the first instruction, the first functional unit is further operable to change a state of the set of addresses to an invalid state after creating the atomic transaction.

In Example 18, in the apparatus of any of Examples 16-17, before performance of the second instruction, the first functional unit is further operable to perform a fourth instruction to register the set of addresses to be modified during the atomic transaction in a transaction tracker.

In Example 19, in the apparatus of any of Examples 16-18, before performance of the second instruction, the first functional unit is further operable to: change a state of the set of addresses to a locked state, and change the state of the set of addresses from the locked state to a processing state when the states of each of the set of addresses are in the locked state to start execution of the atomic transaction.

In Example 20, in the apparatus of any of Examples 16-19, during performance of the third instruction, the first functional unit is further operable to write the data for the set of addresses to an intermediate memory location before committing the data for the set of addresses to the non-volatile memory, and wherein the first functional unit is to lock the set of addresses after writing the data for the set of addresses to the intermediate memory location and before committing the data for the set of addresses to the non-volatile memory.

In Example 21, in the apparatus of any of Examples 16-20, during performance of the third instruction, the first functional unit is further operable to change a state of the set of addresses to a visible state to unlock the set of addresses after the atomic transaction has been committed to the set of addresses in the non-volatile memory.

In Example 22, in the apparatus of any of Examples 16-21, the intermediate memory location is a memory element in a cache, wherein during performance of the third instruction, the functional unit is further to: write the data from the cache to a buffer of the non-volatile memory while the set of addresses are in a locked state; and unlock the set of addresses when the data is written from the cache to the buffer of the non-volatile memory.

In Example 23, in the apparatus of any of Examples 16-22, the cache is operable to store two sets of data for a respective one of the set of address of the non-volatile memory.

In Example 24, in the apparatus of any of Examples 16-23, a first set of the two sets of data is associated with the atomic transaction, wherein a second set of the two sets of data contains data that existed before the functional unit created the atomic transaction.

In Example 25, the apparatus of any of Examples 16-24, further comprising a second functional unit that is operable to execute a thread, wherein the second set of data is returned to the second functional unit when the thread requests to access one of the set of addresses associated with the atomic transaction.

In Example 26, in the apparatus of any of Examples 16-25, writing the data for the set of addresses to the non-volatile memory of the third instruction comprises writing the data to a buffer of the non-volatile memory.

In Example 27, in the apparatus of any of Examples 16-26, the first functional unit is further operable to write the data from the buffer of the non-volatile memory to a set of addresses of the non-volatile memory.

In Example 28, in the apparatus of any of Examples 16-27, the first functional unit is further to track the atomic transaction using a transaction identifier (TID).

In Example 29, in the apparatus of any of Examples 16-28, when the first functional unit is further operable to invalidate the TID after the atomic transaction has been committed.

In Example 30, in the apparatus of any of Examples 16-29, the non-volatile memory is byte-addressable.

Example 31 is a method comprising 1) creating, by a first functional unit of a processing device, an atomic transaction that declares a size of data to be updated atomically, wherein execution of the atomic transaction comprises a plurality of instructions to update the data at a set of addresses in a non-volatile storage medium, wherein the non-volatile storage medium is byte-addressable; 2) performing the atomic transaction; 3) committing the atomic transaction to the set of addresses in the non-volatile storage medium, wherein the updated data is not visible to other functional units of the processing device until the atomic transaction is complete.

In Example 32, the method of Example 31 further comprises unlocking the set of addresses after committing the atomic transaction to the set of addresses in the non-volatile storage medium.

In Example 33, the method of any of Examples 31-32 further comprises registering the atomic transaction to indicate that the set of addresses is to be modified during execution of the atomic transaction.

In Example 34, the method of any of Examples 31-33 further comprises
writing the data associated with the set of addresses in an intermediate memory location before committing the atomic transaction to the set of addresses in the non-volatile storage medium, and wherein committing the atomic transaction to the set of addresses in the non-volatile storage medium comprises writing the data associated with the set of addresses from the intermediate memory location to the non-volatile media.

In Example 35, in the method of any of Examples 31-34 the intermediate memory location is a memory element in a buffer of the non-volatile storage medium.

In Example 36, in the method of any of Examples 31-35 the intermediate memory location is a memory element in a cache, the method further comprises writing the data from the cache to a memory element in a buffer of the non-volatile storage medium while the set of addresses are locked; and unlocking the set of addresses when the data is written from the cache to the buffer of the non-volatile storage medium.

In Example 37, in the method of any of Examples 31-36 writing to the set of addresses comprises updating old data with new data.

In Example 38, in the method of any of Examples 31-37, before the set of addresses is unlocked, the method includes providing, by the processing device, the old data to a second functional unit that is not associated with the atomic transaction.

In Example 39, the method of any of Examples 31-38 further comprises accessing, by a second functional unit, at least one of the set of addresses while the atomic transaction is being executed; and receiving, by the second functional unit, the old data.

In Example 40, in the method of any of Examples 31-39, the old data is received by the second functional unit from the non-volatile storage medium.

In Example 41, in the method of any of Examples 31-40, the first functional unit is associated with a first thread, and wherein the second functional unit is associated with a second thread.

In Example 42, the method of any of Examples 31-41 further comprises identifying a transaction identifier (TID) to a track the atomic transaction.

In Example 43, the method of any of Examples 31-42 further comprises invalidating the TID after mitting the atomic transaction to the set of addresses in the non-volatile storage medium.

In Example 44, the method of any of Examples 31-43 further comprises locking the set of addresses after creating the atomic transaction until each address of the set of addresses is in a locked state; and changing a state of the set of addresses from the locked state to a processing state to begin execution of the atomic transaction.

In Example 45, in the method of any of Examples 31-44, registering the atomic transaction comprises registering the set of addresses to be updated in the non-volatile storage medium after the processing device executes the atomic transaction.

Example 46 is a computing system configured to perform the method of any one of the elements of any one of the Examples 31 to 45.

Example 47 is an apparatus comprising means for performing any method of any element of any one of Examples 31 to 45.

Example 48 is apparatus comprising a processor configured to perform the method of any one of the elements of any one of the Examples 31 to 45.

Example 49 is at least one machine readable medium comprising instructions that, when executed by a computing device, cause the computing device to carry out the method of any one of the elements of any one of the Examples 31 to 45.

Example 50 is a non-transitory machine-readable storage medium including data that, when accessed by a processor, cause the processor to perform operations comprising: 1) creating, by a first functional unit of a processing device, an atomic transaction that declares a size of data to be updated atomically, wherein execution of the atomic transaction comprises a plurality of instructions to update the data at a set of addresses in a non-volatile storage medium, wherein the non-volatile storage medium is byte-addressable; 2) performing the atomic transaction; 3) committing the atomic transaction to the set of addresses in the non-volatile storage medium, wherein the updated data is not visible to other functional units of the processing device until the atomic transaction is complete.

Example 51 is an apparatus comprising 1) means for creating an atomic transaction that declares a size of data to be updated atomically, wherein execution of the atomic transaction comprises a plurality of instructions to update the data at a set of addresses in a non-volatile storage medium; 2) means for performing the atomic transaction; 3) means for committing the atomic transaction to the set of addresses in the non-volatile storage medium, wherein the updated data is not visible to other functional units of the processing device until the atomic transaction is complete.

Example 52 is a system comprising 1) a peripheral device; 2) a non-volatile memory; and 3) a processor coupled to the non-volatile memory, wherein the processor is configured to execute a first functional unit to perform a plurality of instructions associated with an atomic transaction, wherein the plurality of instructions are to update data at a set of addresses in the non-volatile memory atomically, wherein the first functional unit is operable to: a) perform a first instruction to create the atomic transaction that declares a size of the data to be updated atomically, b) perform a second instruction to start execution of the atomic transaction; and c) perform a third instruction to commit the atomic transaction to the set of addresses in the non-volatile memory, wherein the updated data is not visible to other functional units of the processing device until the atomic transaction is complete.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to execution-aware memory protection in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processing device comprising:
a cache;
an interface to a non-volatile storage medium (NVM) operatively coupled to the cache; and
a first functional unit to execute a plurality of instructions associated with an atomic transaction and to track execution of the atomic transaction with a first transaction identifier (TID), wherein the plurality of instructions are to replace data at a set of addresses in the NVM atomically with new data, wherein the first functional unit is to execute the plurality of instructions to:
perform a first instruction to create the atomic transaction that delineates a size of the data to be replaced atomically and generates the first TID;
perform a second instruction to execute the atomic transaction including storing, in first cache lines of the cache, the new data with the set of addresses and the first TID;
perform a third instruction to commit the atomic transaction to the set of addresses in the NVM, wherein the new data is not visible to other functional units until the atomic transaction is complete; and
wherein the second instruction and the third instruction are further to, in response to a read request from a second functional unit to an address of the set of addresses:
determine that the read request lacks the first TID;
access the data associated with the address in a second cache line of the cache that is not associated with a valid TID in response to determining that the read request lacks the first TID, wherein the new data is simultaneously available in the first cache lines when accessing the data in the second cache line; and
send, to the second functional unit, the data for the address.

2. The processing device of claim 1, wherein during performance of the first instruction, the first functional unit is further to change a state of the set of addresses to an invalid state after creating the atomic transaction.

3. The processing device of claim 2, wherein before performance of the second instruction, the first functional unit is further to perform a fourth instruction to register the set of addresses to be modified during the atomic transaction in a transaction tracker.

4. The processing device of claim 2, wherein before performance of the second instruction, the first functional unit is further to:
change the state of the set of addresses to a locked state, and
change the state of the set of addresses from the locked state to a processing state when the state of each of the set of addresses are in the locked state, to start execution of the atomic transaction.

5. The processing device of claim 1, wherein during performance of the third instruction, the first functional unit is further to write the new data for the set of addresses to an intermediate memory location before committing the new data for the set of addresses to the NVM, and
wherein the first functional unit is to lock the set of addresses after writing the new data for the set of addresses to the intermediate memory location and before committing the new data for the set of addresses to the NVM.

6. The processing device of claim 5, wherein after performance of the third instruction, the first functional unit is further to change a state of the set of addresses to a visible state to unlock the set of addresses after the atomic transaction has been committed to the set of addresses in the NVM.

7. The processing device of claim 5, wherein the intermediate memory location is a memory element in the cache, wherein during performance of the third instruction, the first functional unit is further to:
  write the new data from the cache to a buffer of the NVM while the set of addresses are in a locked state; and
  unlock the set of addresses when the new data is written from the cache to the buffer of the NVM.

8. The processing device of claim 1, wherein, before execution of the first instruction, the first functional unit is further to store in second cache lines, including the second cache line, of the cache the data for the set of addresses, each associated with a TID value of zero, indicating the set of addresses is not associated with a valid transaction.

9. The processing device of claim 8, wherein the second functional unit is to execute a thread, wherein the data is returned to the second functional unit from the cache when the thread requests to access any address of the set of addresses associated with the atomic transaction.

10. The processing device of claim 1, wherein the third instruction is further to, in response to a read request to the address from the first functional unit, send to the first functional unit the new data for the address stored in the first cache lines after determining that the read request includes the first TID.

11. The processing device of claim 1, wherein writing the new data for the set of addresses to the NVM according to the third instruction comprises writing the new data to a buffer of the NVM from the cache.

12. The processing device of claim 11, wherein the first functional unit is further to write the new data from the buffer of the non-volatile storage medium to the set of addresses of the NVM.

13. The processing device of claim 1, wherein the first functional unit is further to invalidate the first TID after the atomic transaction has been committed.

14. The processing device of claim 1, wherein the NVM is byte-addressable persistent memory.

15. A method comprising:
  creating, by a first functional unit of a processing device, an atomic transaction that delineates a size of a set of addresses to be written atomically and tracks execution of the atomic transaction with a first transaction identifier (TID), wherein execution of the atomic transaction directs the processing device to replace data at the set of addresses in a non-volatile storage medium (NVM) with new data from the atomic transaction;
  executing, by the first functional unit, the atomic transaction including storing the new data in first cache lines of a cache with the set of addresses and the first TID;
  committing, by the first functional unit, the atomic transaction to the set of addresses in the NVM, wherein the new data is not visible to other functional units of the processing device until the atomic transaction is complete;
  wherein, during the executing and the committing the atomic transaction, and in response to a read request from a second functional unit to an address of the set of addresses:
    determine that the read request lacks the first TID;
    access the data associated with the address in a second cache line of the cache that is not associated with a valid TID in response to determining that the read request lacks the first TID, wherein the new data is simultaneously available in the first cache lines when accessing the data in the second cache line; and
    sending, to the second functional unit, the data for the address.

16. The method of claim 15, further comprising unlocking the set of addresses after committing the atomic transaction to the set of addresses in the NVM.

17. The method of claim 16, wherein writing to the set of addresses comprises replacing the data with the new data, the method further comprising, before the set of addresses is unlocked, providing, by the processing device, the data to the second functional unit that is not associated with the atomic transaction.

18. The method of claim 15, further comprising registering the atomic transaction to indicate that the set of addresses is to be modified during execution of the atomic transaction.

19. The method of claim 15, further comprising:
  writing the new data associated with the set of addresses in an intermediate memory location before committing the atomic transaction to the set of addresses in the NVM, and
  wherein committing the atomic transaction to the set of addresses in the NVM comprises writing the new data associated with the set of addresses from the intermediate memory location to the NVM.

20. The method of claim 19, wherein the intermediate memory location is a memory element in a buffer of the NVM.

21. The method of claim 19, wherein the intermediate memory location is a memory element in the cache, the method further comprising:
  writing the new data from the cache to a memory element in a buffer of the NVM while the set of addresses are locked; and
  unlocking the set of addresses when the new data is written from the cache to the buffer of the NVM.

22. The method of claim 15, further comprising
  sending, to the first functional unit in response to a read request to the address from the first functional unit, the new data for the address stored in the first cache lines after determining that the read request includes the first TID.

23. The method of claim 15, wherein the data is received by the second functional unit from the cache.

24. A non-transitory machine-readable storage medium including instructions that, when executed by a processor, cause the processor to:
  create, by a first functional unit of the processor, an atomic transaction that delineates a size of data to be replaced atomically and tracks execution of the atomic transaction with a first transaction identifier (TID), wherein execution of the atomic transaction comprises replacing the data at a set of addresses in a non-volatile storage medium (NVM) with new data from the atomic transaction, wherein the NVM is byte-addressable persistent memory;

execute, by the first functional unit, the atomic transaction to include storing the new data in first cache lines of a cache with the set of addresses and the first TID; and commit, by the first functional unit, the atomic transaction to the set of addresses in the NVM, wherein the new data is not visible to other functional units of the processor until the atomic transaction is complete;

wherein, before completion of the atomic transaction and in response to a read request from a second functional unit to an address of the set of addresses, the instructions further to cause the processor to:

determine that the read request lacks the first TID;

access the data associated with the address in a second cache line of the cache that is not associated with a valid TID in response to determining that the read request lacks the first TID, wherein the new data is simultaneously available in the first cache lines when accessing the data in the second cache line; and send, to the second functional unit, the data for the address.

25. The non-transitory machine-readable storage medium of claim 24, wherein the instructions further to, when executed by the processor, cause the processor to, in response to a read request to the address from the first functional unit, send to the first functional unit the new data for the address stored in the first cache lines after determining that the read request includes the first TID.

* * * * *